US009311374B2

(12) United States Patent
Darcy et al.

(10) Patent No.: US 9,311,374 B2
(45) Date of Patent: Apr. 12, 2016

(54) REPLICATING DATA OBJECTS WITHIN A STORAGE NETWORK BASED ON RESOURCE ATTRIBUTES

(75) Inventors: Jeffrey Darcy, Lexington, MA (US); David Lutterkort, San Francisco, CA (US)

(73) Assignee: Red Hat, Inc., Raleigh, NC (US)

( * ) Notice: Subject to any disclaimer, the term of this patent is extended or adjusted under 35 U.S.C. 154(b) by 518 days.

(21) Appl. No.: 12/957,183

(22) Filed: Nov. 30, 2010

(65) Prior Publication Data

US 2012/0136829 A1    May 31, 2012

(51) Int. Cl.
G06F 17/30    (2006.01)
G06F 7/00    (2006.01)
G06F 11/20    (2006.01)

(52) U.S. Cl.
CPC ...... G06F 17/30575 (2013.01); *G06F 11/2094* (2013.01)

(58) Field of Classification Search
USPC .................................. 707/654, 665, 694, 812
See application file for complete search history.

(56) References Cited

U.S. PATENT DOCUMENTS

| 6,415,282 | B1 * | 7/2002 | Mukherjea et al. ........... 707/737 |
| 6,512,850 | B2 * | 1/2003 | Yaung ........................... 382/225 |
| 6,941,321 | B2 * | 9/2005 | Schuetze et al. | |
| 7,099,860 | B1 * | 8/2006 | Liu et al. | |
| 7,165,080 | B2 * | 1/2007 | Kotcheff et al. ............. 707/706 |
| 7,325,019 | B2 * | 1/2008 | Lam et al. | |
| 7,395,352 | B1 * | 7/2008 | Lam et al. ..................... 709/244 |
| 7,509,409 | B2 * | 3/2009 | Penny et al. .................. 709/223 |
| 7,599,941 | B2 * | 10/2009 | Bahar et al. | |
| 7,661,028 | B2 * | 2/2010 | Erofeev .......................... 714/15 |
| 7,725,444 | B2 * | 5/2010 | Devarakonda et al. ....... 707/694 |
| 7,778,984 | B2 * | 8/2010 | Zhang et al. .................. 707/696 |
| 7,809,914 | B2 * | 10/2010 | Kottomtharayil et al. .... 711/170 |
| 7,904,423 | B2 * | 3/2011 | Vermeulen et al. ........... 707/626 |
| 8,010,498 | B2 * | 8/2011 | Gounares et al. ............. 707/665 |
| 8,074,042 | B2 * | 12/2011 | Kottomtharayil et al. .... 711/170 |
| 8,121,966 | B2 * | 2/2012 | Routray et al. ................. 706/46 |
| 8,352,424 | B2 * | 1/2013 | Zunger et al. ................. 707/610 |
| 8,560,639 | B2 * | 10/2013 | Murphy et al. ............... 709/219 |
| 2004/0205629 | A1 * | 10/2004 | Rosenholtz et al. .......... 715/526 |
| 2006/0236061 | A1 * | 10/2006 | Koclanes ....................... 711/170 |
| 2007/0022129 | A1 * | 1/2007 | Bahar et al. ................... 707/100 |
| 2007/0133947 | A1 * | 6/2007 | Armitage et al. ............... 386/95 |
| 2007/0214183 | A1 * | 9/2007 | Howe et al. ................... 707/200 |
| 2008/0198752 | A1 * | 8/2008 | Fan et al. ...................... 370/238 |
| 2010/0274762 | A1 * | 10/2010 | Murphy et al. ............... 707/636 |
| 2011/0040792 | A1 * | 2/2011 | Perry ............................. 707/783 |

(Continued)

OTHER PUBLICATIONS

Jeffrey Darcy, Systems and Methods for Replicating a Group of Data Objects Within a Storage Network, U.S. Appl. No. 12/956,527, filed Nov. 30, 2010.

*Primary Examiner* — Jeffrey A Burke
(74) *Attorney, Agent, or Firm* — Lowenstein Sandler LLP

(57) ABSTRACT

Embodiments relate to systems and methods for replicating data from a primary resource to a secondary resource within a storage network based on resource attributes. In particular, a user can specify a policy framework comprising one or more count selections and one or more attributes. A policy generation module can determine candidate resources that match the policy framework, and order the candidate resources based on one or more factors. The policy generation module can generate a replication policy based on the ordered resources and replicate the data according to the replication policy.

16 Claims, 5 Drawing Sheets

(56) References Cited

U.S. PATENT DOCUMENTS

| | | | |
|---|---|---|---|
| 2011/0040796 A1* | 2/2011 | Shockro et al. | 707/794 |
| 2011/0125704 A1* | 5/2011 | Mordvinova et al. | 707/600 |
| 2011/0161294 A1* | 6/2011 | Vengerov et al. | 707/637 |
| 2011/0196664 A1* | 8/2011 | Zunger et al. | 703/21 |
| 2011/0196830 A1* | 8/2011 | Zunger et al. | 707/624 |
| 2011/0196831 A1* | 8/2011 | Zunger et al. | 707/634 |
| 2011/0196832 A1* | 8/2011 | Zunger et al. | 707/634 |
| 2011/0196873 A1* | 8/2011 | Kesselman | 707/741 |
| 2012/0036105 A1* | 2/2012 | Souza et al. | 707/622 |
| 2013/0091534 A1* | 4/2013 | Gilde et al. | 726/1 |

* cited by examiner

REPLICATING DATA OBJECTS WITHIN A STORAGE NETWORK BASED ON RESOURCE ATTRIBUTES

FIELD

The present teachings relate to systems and methods for replicating data objects within a storage network based on resource attributes, and more particularly to platforms and techniques for replicating data objects based on count and attribute specifications.

BACKGROUND OF RELATED ART

Data replication can be used to ensure consistency among software or hardware resources in a storage network. In operation, data on a primary server or device is backed up, or replicated, on a secondary file server or device. Therefore, if data is ever lost on the primary server, the replicated data can be recovered from the secondary server. The servers can be local or remote with respect to one another and can be connected via a network such as a local area network (LAN), wide area network (WAN), or metropolitan area network (MAN).

In existing platforms, data is replicated based on a replication policy that specifies how the data is to be replicated from the primary server to the secondary server. In particular, the replication policy includes defined inputs that specify where, when, or how the data is to be replicated, among other relationships. However, the defined inputs are limited to location attributes associated with the secondary server. Therefore, an administrator of the storage network is locked into generating a replication policy based on the secondary server location when implementing the policy framework. As a result, an administrator is not able to generate or modify a data replication in a storage network to accommodate a wide range of attributes associated with the resources of the storage network.

Therefore, it may be desirable to provide systems and methods for replicating data objects within a storage network based on resource attributes. In particular, it may be desirable to allow a user to specify count selections and resource attributes in generating a replication policy.

DESCRIPTION OF EMBODIMENTS

Figure 1:
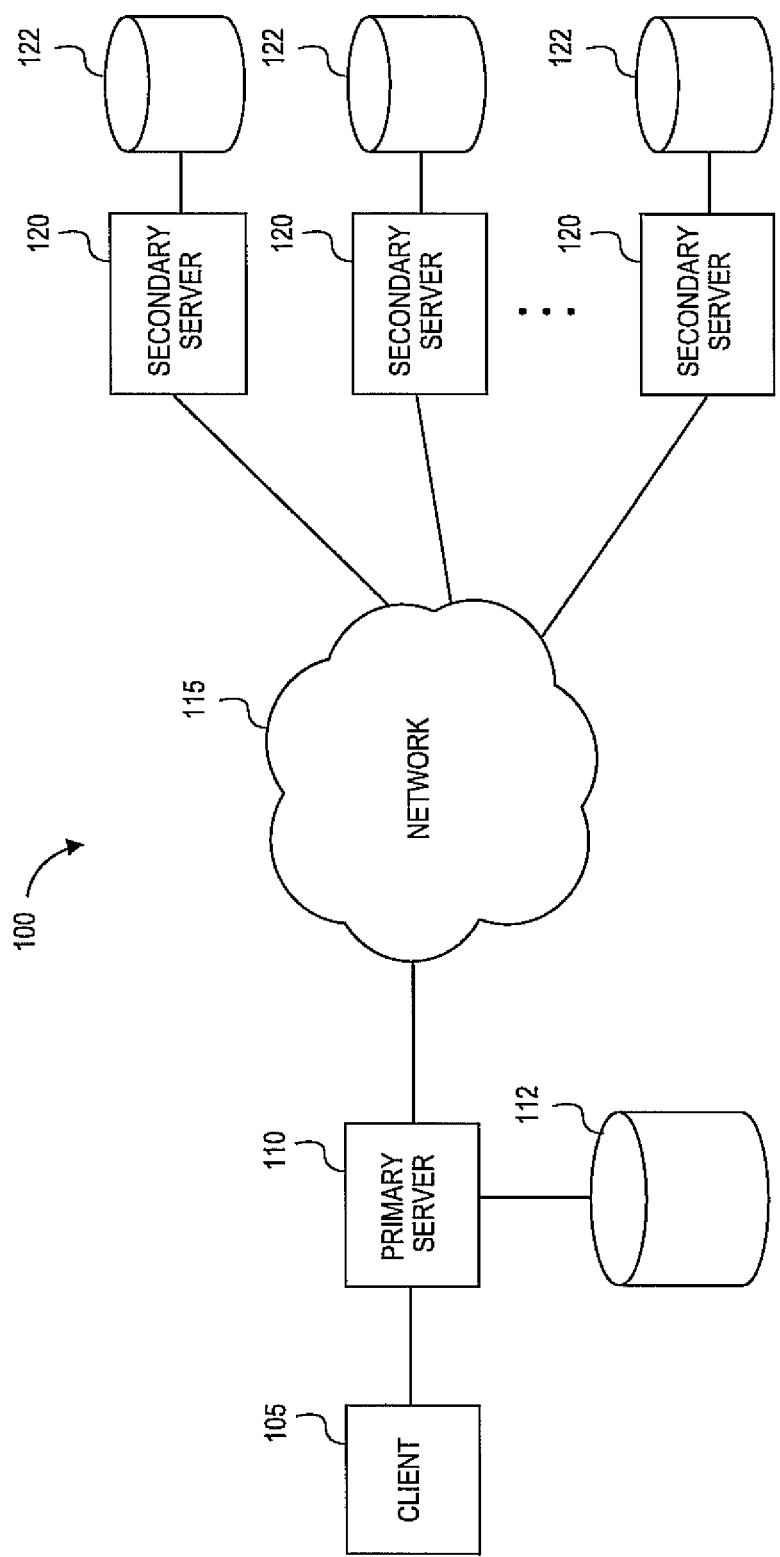
FIG. 1 illustrates an overall storage network architecture in which various embodiments of the present teachings can be practiced.

Embodiments of the present teachings relate to systems and methods for replicating data objects within a storage network based on resource attributes. In particular, embodiments relate to platforms and techniques for replicating data objects according to a user-specified framework comprising count selections and attribute specifications. In embodiments, specifications associated with a policy framework can be input by a user or can be generated automatically in the storage network by processes or other logic. The policy framework can specify one or more count selections and/or one or more attributes associated with the resources in the storage network. In embodiments, the one or more count selections can refer to a number of resources on which the data objects are to be replicated, and the one or more attributes can dictate which resources on which the data objects are to be replicated. In some embodiments, the attributes can be user specified or can be dynamically determined at any point before or during the replication process, or during the generation of a replication policy. In some embodiments, candidate resources can be ranked or ordered according to costs or other factors. A policy generation module can generate the replication policy based on the one or more count selections, the one or more attributes, the ranking of the resources, or other factors, and data objects can be replicated based on the replication policy.

Embodiments described herein can be implemented in or supported by a storage network architecture. In embodiments, the storage network can be a cloud-based network. As used herein, a "storage network" can be any network configured with storage resources such as, for example, servers, hard drives, virtual memory, databases, random access memory (RAM), other memory, and any other resource configured to store data. The storage resources can be directly connected or connected via a network such as, for example, a cloud-based network, a local area network (LAN), wide area network (WAN), wireless network, virtual private network (VPN), storage area network (SAN), and other networks.

As used herein, "replication" can be any process that can be used to duplicate, copy, or otherwise reproduce one or more data objects from one resource to another resource. The "primary" or "first" resource can refer to the resource from which the data objects are to be copied and the "secondary" or "second" resource can refer to the resource to which the data objects are to be copied. Further, as used herein, a "data object" can be any type of file, application, value, variable, function, data structure, or the like that can be read from and/or stored on a resource. As used herein, a "user" can refer a person, customer, subscriber, administrator, corporation, organization, or other entity accessing modules or inputting values associated with the storage network. In embodiments, the user can operate or manage computer software or hardware that can generate or determine a replication policy to be applied to a data object.

Further, as used herein, a "count selection" or "count" can be an integer that can refer to a number, amount, quantity, or the like of nodes associated with resources on which the data object is to be replicated. Still further, as used herein, an "attribute" can be any characteristic, property, quality, trait, or the like associated with the resources of the storage network, such as, for example, business units, data types, data sizes, data names, data owners, locations, operating systems, budget pools, data functions, legal or regulatory jurisdictions, storage and data transfer capacities, security data, language support characteristics, and other attributes.

As used herein, a "cloud-based network" can comprise a collection of resources that can be invoked to instantiate a virtual machine, process, or other resource for a limited or defined duration. In embodiments, the cloud-based network can be implemented as a software as a service (SaaS). For example, vendors such as independent software vendors (ISVs) can supply software resources for use with other resources in a cloud-based network. Resources in the cloud-based network can include any hardware, software, or communications resources, such as ports or channels provided to a virtual machine or other machine or process in the cloud. Resources can likewise include services, such as Web-based services deployed in the cloud, for example security or identity management services and/or other resources.

FIG. 1 illustrates an exemplary storage network 100 for facilitating data replication. The storage network 100 can comprise a client 105 coupled to a primary server 110. In embodiments, the client 105 can couple to the primary server 110 either locally or through a network such as a LAN, wireless network, or other networks. The client 105 can be a personal computer (PC), workstation, cell phone, or other wired or wireless computing device capable of communicating data. The primary server 110 can represent a data center, can be configured to facilitate data replication, and can be coupled to a repository 112. In embodiments, the primary server 110 can comprise local storage configured to store data. The repository 112 can comprise any type of storage, and any multiple of resources, such as, for example, storage racks, hard drives, virtual memory, databases, random access memory (RAM), and other memory. The repository 112 can be accessed by users or by software or applications independent from or associated with resources of the storage network 100. It should be appreciated that the primary server 110, repository 112, or any other resource associated with the storage network 100 can be implemented in a cloud-based network.

The storage network 100 can further comprise a set of secondary servers 120 that can be coupled to the primary server 110 via a network 115. Although described herein as the primary server and the set of secondary servers, it should be appreciated that the primary server and the set of secondary servers can be interchangeable such that any server can be an originating or primary server, as well as a target or secondary server. In embodiments, the network 115 can be cloud-based, or a LAN, WAN, MAN, or any other network. The set of secondary servers 120 can represent data centers and can each be coupled to a secondary repository 122 comprising any type of storage, and any multiple of resources such as, for example, data racks, hard drives, virtual memory, databases, random access memory (RAM), and other memory. The primary server 110 can be configured to communicate data to any of the set of secondary servers 120 via the network 115. In embodiments, the communicated data can be data stored on primary repository 112 that is to be replicated on one or more secondary repositories 122 via one or more respective secondary servers 120.

Figure 2:
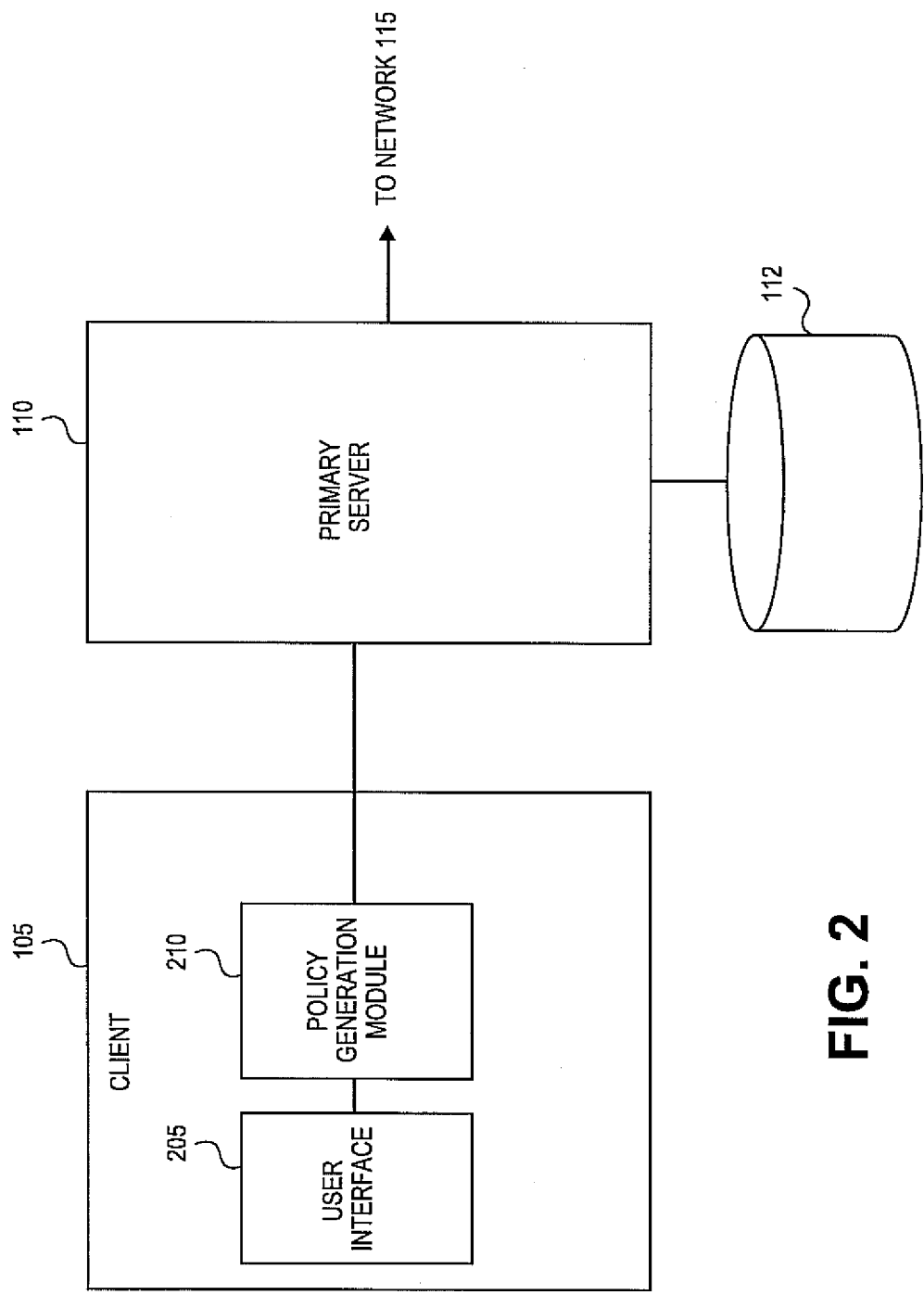
FIG. 2 illustrates an overall storage network architecture in which various embodiments of the present teachings can be practiced in another regard, according to various embodiments.

FIG. 2 illustrates an exemplary configuration that can be used in systems and methods for replicating data objects based on resource attributes. In embodiments as shown, the client 105 can comprise a user interface 205 and a policy generation module 210. It should be also appreciated that the user interface 205 and policy generation module 210 as shown in FIG. 2 can be implemented in the client 105, the primary server 110, a combination thereof, or any other resource associated with the storage network 100.

The user interface 205 can be configured to receive parameters from a user, owner, administrator, or other entity operating the client 105 or other resource. In embodiments, the parameters can be one or more count selections and/or one or more attributes, and can be related to a replication policy and can specify where, how, and/or when the data from the primary server 110 is to be replicated. According to embodiments, the policy generation module 210 can manage the replication policy based on the received parameters. In embodiments, the parameters can be dynamically determined from any of the primary server 110, the repository 112, the client 105, the data objects to be replicated, the set of secondary servers 120, the secondary repositories 122, and/or any other resource associated with the storage network 100. The policy generation module 210 can be configured to generate a replication policy and perform the data replication based on the parameters. For example, the policy generation module 210 can retrieve data from the repository 112 and provide, via the primary server 110 and the network 115, the data to any applicable secondary server 120 for storage on any applicable secondary repository 122, as specified by the parameters.

According to embodiments, the user interface 205 can be configured to receive one or more count selections associated with the resources on which the data objects are to be replicated. In embodiments, the one or more count selections can be received from a user, owner, administrator, or other entity operating the client 105 or other resource, or can be automatically generated. In embodiments, the one or more count selections can represent a number requirement for the replication of the data objects. For example, two count selections can specify that a data object is to be replicated on a total of five (5) resources across exactly three (3) data centers. For further example, three count selections can specify that a data object is to be replicated on a total of four (4) resources across a minimum of two (2) data centers, but only to use one (1) data rack at a given data center. For further example, a single count selection can specify that a data object is to be replicated across two (2) different operating systems. It should be appreciated that count selections can specify maximums, minimums, and exact numbers, and in any combination or multiplicity.

According to embodiments, the user interface 205 can be configured to receive one or more attributes associated with the resources on which to replicate the data objects. In embodiments, the one or more attributes can be received from a user, owner, administrator, or other entity operating the client 105 or other resource, or can be automatically generated. For example, a budget attribute can specify that the data objects are to be replicated across different budget pools. For further example, a security attribute can specify that the data objects are to be replicated across servers with different security policies. It should be appreciated that other attributes associated with the resources are envisioned.

In embodiments, the one or more attributes can be related to the one or more count selections. In particular, the count selection can specify the number of resources on which to replicate the data objects, and the attribute can dictate which resources are viable candidates on which to replicate the data objects. For example, a user can specify that data objects are to be replicated across four repositories (count selection), each having a different native language support (attribute). This way, the selection of the repositories is dictated by their associated native language support. In other words, the policy generation module 210 or other logic will not select any two repositories having the same native language support. For further example, a user can specify that a data object is to be replicated on two repositories (count selection) that meet a set of security requirements (attribute). Therefore, any candidate repositories that meet the set of security requirements will be accepted as viable candidate repositories, and any candidate repositories that do not meet the set of security requirements will be rejected. It should be appreciated that any combination, in any multiple, of count selections and attributes is envisioned.

According to embodiments, the policy generation module 210 or other logic can rank or order a set of candidate attributes based on one or more factors such as, for example, cost, business units, data sizes, data names, data owners, locations, data functions, legal or regulatory jurisdictions, storage and data transfer capacities, security data, language support characteristics, and other factors. Further, in embodiments, a notification of the replication policy can be generated and provided to a user, in any way via any communication or network.

As an example, a branch of a bank can implement a data replication policy such that data associated with daily activity of the branch (e.g. transactions, new account openings, etc.) is to be replicated at close of business each day. A count selection and an attribute specification can specify that the activity data is to be replicated on five servers of regional offices of the bank, but only servers that are associated with an operations business unit of the bank. A replication system of the branch can determine, at close of business each day, five or more operations servers of the bank. In the process, the replication system can reject as a viable candidate any server that is not an operations server. Further, the replication system can order the determined operations servers based on any factor such as, for example, the cost of replicating the activity data. The data replication policy can be generated based on the ordered operations servers, and the activity data can be replicated on the ordered operations servers. Further, if a new operations server is implemented, the replication system can consider the new operations server as a replication destination without the need to update the replication policy.

In other embodiments, even after a framework of a data replication policy are specified by a user or other system logic, the policy generation module 210 can dynamically add new attributes or count selections into the framework. For example, and continuing with the bank example as described herein, suppose that the operations servers of the bank are assigned to a specific legal or regulatory jurisdiction. For example, each operations server can be assigned a regulatory jurisdiction consistent with the state in which the operations server or associated office is located, along with details of the regulations, such as, for example, what type of data needs to be reported in which state. The replication system can detect the jurisdiction assignments and add an attribute requirement into the framework. For example, the replication system can append the requirement that the activity data be replicated on operations servers having different jurisdiction regulations. The replication system can determine which operations servers have unique jurisdiction regulations and appropriately replicate the activity data on those operations servers. As such, not only can the replication system dynamically determine the attributes for the parameters in the framework, but the replication system can also dynamically determine the parameters to enter into the framework.

Figure 3:
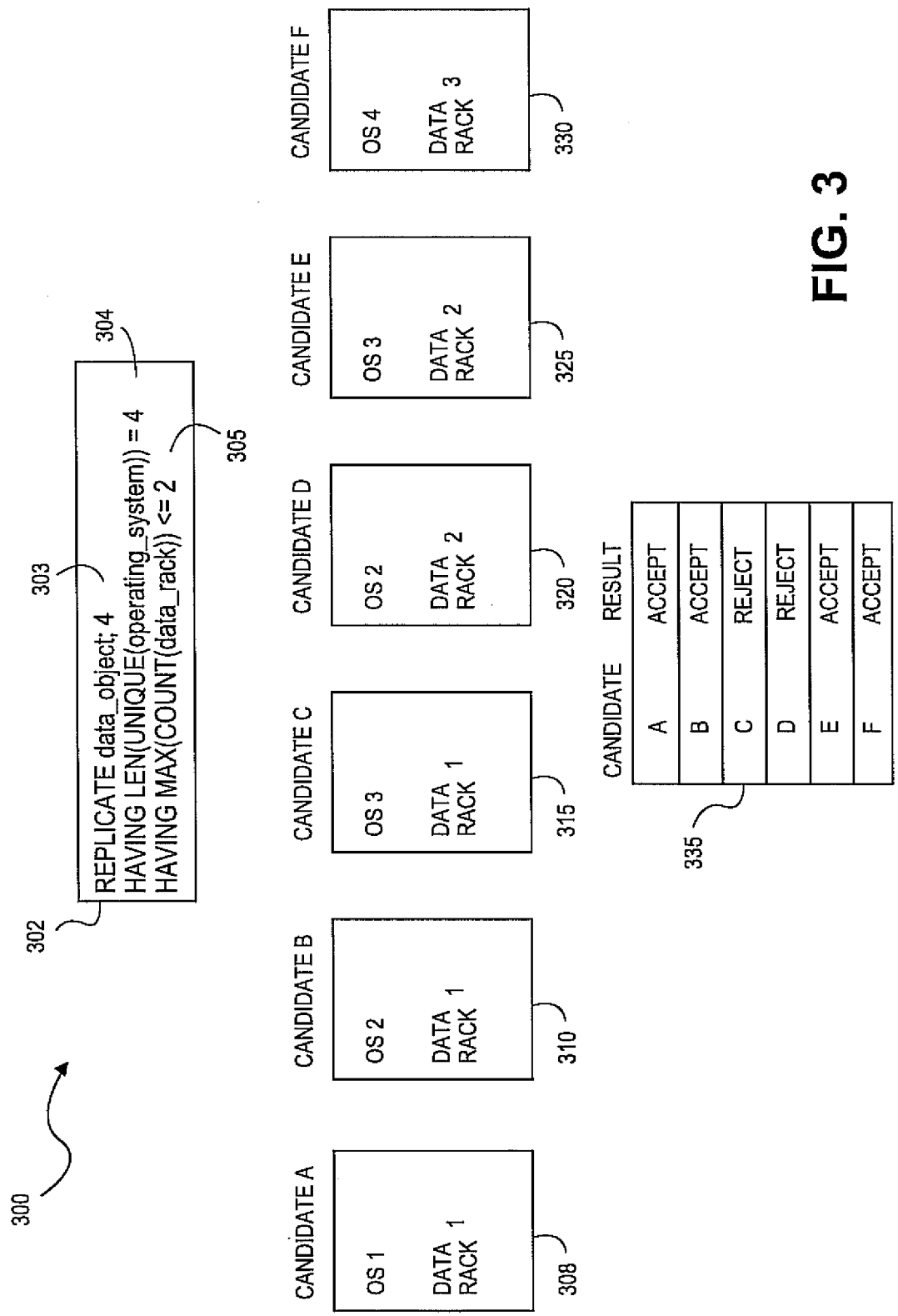
FIG. 3 illustrates an exemplary depiction of a replication policy scenario, according to various embodiments.

FIG. 3 is an exemplary depiction of a policy generation scenario 300. It should be appreciated that the policy generation scenario 300 and each component therein are merely exemplary and other scenarios are envisioned. As shown in FIG. 3, an exemplary code snippet 302 can specify how a "data_object" is to be replicated. In particular, the code snippet 302 can specify that data_object is to be replicated four times (as specified by 303), whereby each of the four replications must take place on a unique "operating_system" (as specified by 304) and whereby a given "data_rack" can be used two or fewer times (as specified by 305). It should be appreciated that the code snippet 302 is merely exemplary and can be rearranged or constructed in any way or in any programming language.

In embodiments, the policy generation module 210 or other logic can examine candidate replication sites to determine candidates that fulfill the requirements of the code snippet 302. As shown in FIG. 3, the policy generation module 210 can examine Candidate A 308, which has an operating system (OS) version 1 and is associated with a data rack 1. Because the policy generation module 210 has encountered neither OS version 1 nor data rack 1, Candidate A 308 is accepted as a viable candidate on which to replicate data_object. Next, the policy generation module 210 or other logic can examine Candidate B 310, which has an OS version 2 and is also associated with data rack 1. The policy generation module 210 has not encountered OS version 2, but has encountered data rack 1 one previous time. Therefore, Candidate B 310 is accepted as a viable candidate on which to replicate data_object because the OS is unique and because the data_rack attribute allows up to two (2) replications on the same data rack.

Next, the policy generation module 210 or other logic can examine Candidate C 315, which has an OS version 3 and is also associated with data rack 1. The policy generation module 210 has not encountered OS version 3, but has encountered data rack 1 two previous times. Therefore, Candidate C 315 is rejected as a viable candidate on which to replicate data_object because although the operating system is unique, the data_rack attribute only allows up to two (2) replications on the same data rack, and Candidate C 315 would use data rack 1 for the third time. Next, the policy generation module 210 or other logic can examine Candidate D 320, which has an OS version 2 and is associated with data rack 2. The policy generation module 210 has already encountered OS version 2 and has not encountered data rack 2. Therefore, Candidate D 315 is rejected as a viable candidate on which to replicate data_object because although data rack 2 has not yet been encountered, the operating_system attribute requires that data_object be replicated on four (4) different operating systems.

Next, the policy generation module 210 or other logic can examine Candidate E 325, which has an OS version 3 and is associated with data rack 2. The policy generation module 210 has only encountered OS version 3 on rejected Candidate C 315, and has only encountered data rack 2 on rejected Candidate D 320. Therefore, Candidate E 320 is accepted as a viable candidate on which to replicate data_object because the operating system is unique and because data rack 2 has not yet been identified as part of an accepted candidate. Next, the policy generation module 210 or other logic can examine Candidate F 330, which has an OS version 4 and is associated with data rack 3. The policy generation module 210 has encountered neither OS version 4 nor data rack 3. Therefore, Candidate E 320 is accepted as a viable candidate on which to replicate data_object because the operating system is unique and because data rack 3 has not been used more than twice.

As shown in FIG. 3, a table 335 can compile results of the candidate determination. In embodiments, the policy generation module 210 or other logic can order the accepted candidates based on one or more factors, as discussed herein. For example, the policy generation module 210 or other logic can order the accepted candidates based on which candidates are closest to the primary server (server_A). It should be appreciated that other ranking factors are contemplated.

In embodiments, program code comprising various constraint clauses, such as 303, 304, and 305, can use a variety of functions and can be used to dictate replication policies. For example, a UNIQUE(list) clause can be used to return a list like an original but with duplicates removed. For further example, a LEN(list) clause can be used to return a length of a list. For further example, a COUNT(list) clause can be used to return a list of repeat counts for unique elements in the original. For further example, a MAX(list) can be used to return the highest number in a list. Referring back to FIG. 3, the resulting data sets for the exemplary constraint clauses discussed herein upon examining the first three candidates 308, 310, and 315 comprise: UNIQUE(operating_system)= {1, 2, 3}; LEN(UNIQUE(operating_system))=3; COUNT (data_rack)={3}; and MAX(COUNT(data_rack))=3. It should be appreciated that the constraint clauses are merely exemplary and that other constraint clauses and functions are envisioned.

Figure 4:
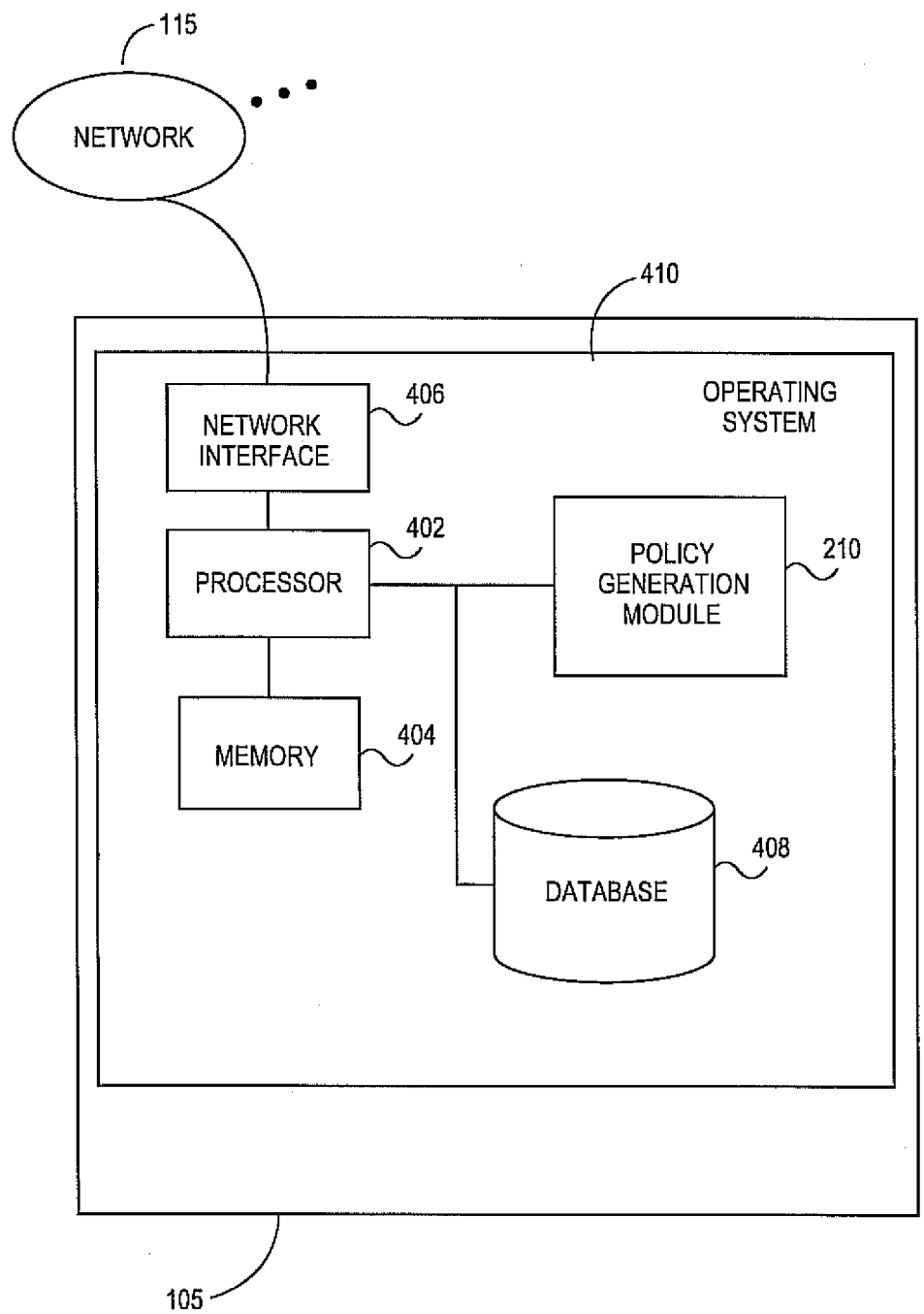
FIG. 4 illustrates an exemplary hardware configuration implemented in a storage network, according to various embodiments.

FIG. 4 illustrates an exemplary diagram of hardware and other resources that can be incorporated in the client 105 configured to communicate with the primary server 110 and the set of secondary servers 120 (as shown in FIG. 1) via the one or more networks 115, according to embodiments. It should be understood that the resources can be implemented in other resources associated with the storage network 100. In embodiments as shown, the client 105 can comprise a processor 402 communicating with memory 404, such as electronic random access memory, operating under control of or in conjunction with an operating system 410. The operating system 410 can be, for example, a distribution of the Linux™ operating system, the Unix™ operating system, or other open-source or proprietary operating system or platform. The processor 402 can also communicate with one or more computer readable storage medium 408, such as hard drives, optical storage, databases, and the like. The processor 402 can further communicate with a network interface 406, such as an Ethernet or wireless data connection, which in turn communicates with the one or more networks 115, such as the Internet or other public or private networks.

The processor 402 can also communicate with the computer readable storage medium 408 and the policy generation module 210, to execute control logic, generate a replication policy, replicate data objects according to the replication policy as described herein, and control the operation of the servers and other resources associated with the storage network 100. Other configurations of the client 105, associated network connections, and other hardware and software resources are possible.

Figure 5:
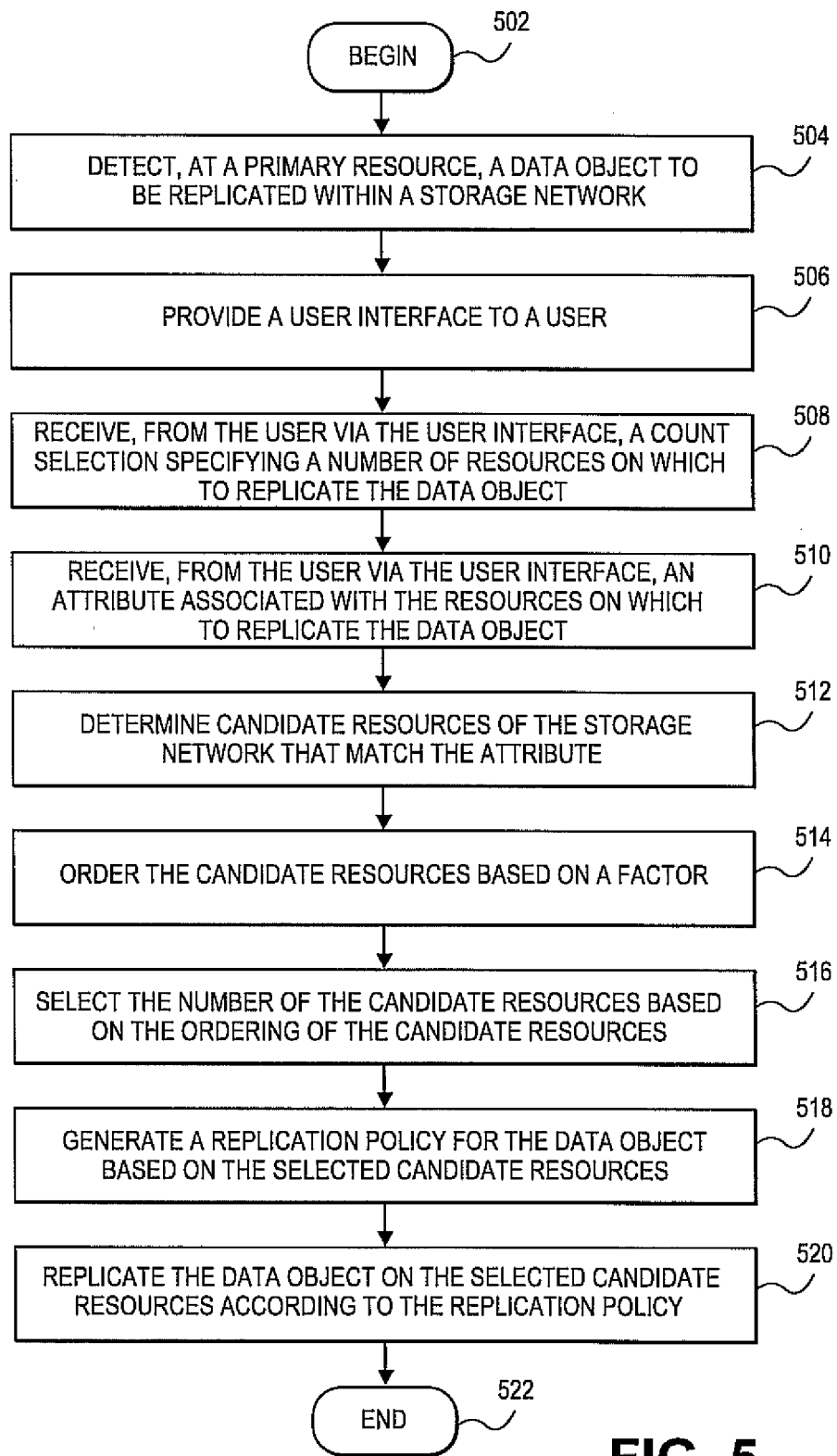
FIG. 5 illustrates a flowchart for replicating data within a storage network based on resource attributes, according to various embodiments.

FIG. 5 illustrates a flowchart for overall data replication in a storage network based on resource attributes, according to various embodiments. In embodiments, the data replication can be among local or remote resources in a storage network. In 502, processing can begin. In 504, a data object to be replicated within a storage network can be detected. In embodiments, the data object can be detected on a primary resource within the storage network. In 506, a user can be provided with a user interface for inputting counts and/or attributes associated with a policy framework for replicating the data object. In embodiments, the user can be any owner, operator, administrator, or the like with the ability to conduct the replication of the data object. Further, in embodiments, the user can access the user interface via a client associated with the storage network. In further embodiments, the counts and the attributes of the policy framework can be generated automatically by any process or logic without the need for the user interface.

In 508, a count selection specifying a number of resources on which to replicate the data object can be received from the user via the user interface. In embodiments, multiple count selections associated with multiple resources can be received from the user. In further embodiments, the count selection can represent a maximum, minimum, or exact number of associated resources on which to replicate the data object, as discussed herein. In 510, an attribute associated with the resources on which to replicate the objects can be received from the user via the user interface. In embodiments, the attribute can specify a characteristic of the resource on which to replicate the data object, as discussed herein. For example, the attribute can specify that the data object is to be replicated on resources with differing operating systems. In embodiments, the attribute in combination with the count selection can dictate the policy framework.

In 512, candidate resources of the storage network that match the attribute can be determined. In embodiments, the policy generation module 210 or other logic can determine a number of candidate resources that match the count selection received from the user, or can determine more candidate resources than the number of resources specified by the count selection. In 514, the candidate resources can be ordered based on a factor. In embodiments, the factor can be received from a user via the user interface and can specify any aspect of the storage network, as discussed herein. In 516, the number of the candidate resources can be selected based on the ordering of the candidate resources. In embodiments, the highest-ordered candidate resources based on the factor and up to the number can be selected.

In 518, a replication policy for the data object can be generated based on the selected candidate resources. In 520, the policy generation module 210 or other logic can replicate the data object on the selected candidate resources according to the replication policy. In embodiments, the data object can be replicated in any way via any network. In 522, processing can end.

The foregoing description is illustrative, and variations in configuration and implementation may occur to persons skilled in the art. For example, while embodiments have been described which operate using one policy generation module 210 and associated storage network 100, in embodiments, one or more of policy generation module 210 and storage network 100, and/or other servers, data stores, and/or other logic or resources can be used. For further example, while embodiments have been described in which data replication policies are generated or modified, in embodiments, the data replication policies and resources associated with the policies can be modified or adjusted according to any combination and at any time or interval. Other resources described as singular or integrated can in embodiments be plural or distributed, and resources described as multiple or distributed can in embodiments be combined. The scope of the present teachings is accordingly intended to be limited only by the following claims.

What is claimed is:

1. A method comprising:
   detecting a data object to be replicated;
   receiving a number representing a quantity of a plurality of resources on which the data object is to be replicated and receiving a plurality of attributes associated with the plurality of resources, wherein the plurality of attributes comprise a programming language supported by the plurality of resources;
   determining a plurality of candidate resources in view of the plurality of attributes;
   ordering the plurality of candidate resources in view of a factor;
   selecting a subset of the plurality of candidate resources in view of the ordering of the plurality of candidate resources and the received number;
   generating, by a hardware processor, a replication policy for the data object in view of the received number and the plurality of attributes; and replicating, according to the replication policy, the data object on the subset of candidate resources.

2. The method of claim 1, further comprising ordering the plurality of candidate resources in view of a cost factor, wherein generating the replication policy comprises:
selecting the quantity of the subset of candidate resources; and
entering the quantity of the subset of candidate resources into a policy framework.

3. The method of claim 1, further comprising:
determining the replication policy for the data object in view of the ordering of the plurality of candidate resources.

4. The method of claim 3, wherein the factor is specified by a policy framework.

5. The method of claim 1, further comprising:
providing a user interface; and
receiving the number indicating the quantity of the plurality of resources and the plurality of attributes associated with the plurality of resources via the user interface.

6. The method of claim 1, further comprising:
dynamically determining the quantity of the plurality of resources and the plurality of attributes associated with the plurality of resources.

7. The method of claim 2, wherein the policy framework further specifies that each of the plurality of resources is associated with a unique value for each of the plurality of attributes.

8. The method of claim 1, further comprising:
generating a notification indicating the replication policy; and
providing the notification to a user.

9. A system comprising:
an interface to a plurality of resources; and
a hardware processor, to communicate with the plurality of resources via the interface, the hardware processor to:
detect a data object to be replicated;
receive a number representing a quantity of the plurality of resources on which the data object is to be replicated and receiving a plurality of attributes associated with the plurality of resources, wherein the plurality of attributes comprise a programming language supported by the plurality of resources;
determine a plurality of candidate resources in view of the plurality of attributes;
order the plurality of candidate resources in view of a factor;
select a subset of the plurality of candidate resources in view of the ordering of the plurality of candidate resources and the received number;
generate a replication policy for the data object in view of the selected candidate resources received number and the plurality of attributes; and
replicate, according to the replication policy, the data object on the subset of candidate resources.

10. The system of claim 9, wherein the hardware processor is further to order the plurality of candidate resources in view of a cost factor, and wherein to generate the replication policy, the hardware processor is to:
select the quantity of the subset of candidate resources; and
enter the quantity of the subset of candidate resources into a policy framework.

11. The system of claim 9, wherein the hardware processor is further to:
determine the replication policy for the data object in view of the ordering of the plurality of candidate resources.

12. The system of claim 11, wherein the factor is specified by a policy framework.

13. The system of claim 9, wherein the hardware processor is further to:
provide a user interface; and
receive the number representing the quantity of the plurality of resources and the plurality of attributes associated with the plurality of resources via the user interface.

14. The system of claim 9, wherein the hardware processor is further to:
dynamically determine the quantity of the plurality of resources and the plurality of attributes associated with the plurality of resources.

15. The system of claim 10, wherein the policy framework further specifies that each of the plurality of resources is associated with a unique value for each of the plurality of attributes.

16. The system of claim 9, wherein the hardware processor is further to:
generate a notification indicating the replication policy; and
provide the notification to a user.

* * * * *